(12) United States Patent
Nakamura et al.

(10) Patent No.: US 7,079,738 B2
(45) Date of Patent: Jul. 18, 2006

(54) METHOD FOR MANUFACTURING A GLASS DOPED WITH A RARE EARTH ELEMENT AND FIBER FOR OPTICAL AMPLIFICATION USING THE SAME

(75) Inventors: Toshihiro Nakamura, Tokyo (JP); Keiichi Aiso, Tokyo (JP); Takeshi Yagi, Tokyo (JP); Hisashi Koaizawa, Tokyo (JP); Yoko Moriai, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/824,429

(22) Filed: Apr. 15, 2004

(65) Prior Publication Data

US 2004/0190846 A1 Sep. 30, 2004

Related U.S. Application Data

(63) Continuation of application No. PCT/JP02/10658, filed on Oct. 15, 2002.

(30) Foreign Application Priority Data

Oct. 15, 2001 (JP) ............................. 2001-317344
Oct. 31, 2001 (JP) ............................. 2001-335626

(51) Int. Cl.
*G02B 6/02* (2006.01)
*C03B 37/023* (2006.01)

(52) U.S. Cl. .......................... 385/123; 65/385

(58) Field of Classification Search ........ 385/123–127, 385/141–143; 372/6; 359/341.1, 341.3, 359/341.5; 65/385, 390; 501/64, 68
See application file for complete search history.

(56) References Cited

U.S. PATENT DOCUMENTS

| 4,519,826 | A | * | 5/1985 | Tran .............................. 65/397 |
| 4,962,995 | A | * | 10/1990 | Andrews et al. ............. 359/342 |
| 5,070,506 | A | * | 12/1991 | Yanagita et al. .............. 372/40 |

(Continued)

FOREIGN PATENT DOCUMENTS

EP 0 565 439 10/1993

(Continued)

OTHER PUBLICATIONS

S. Ohara et al. Extra-broadband and highly efficient short length Bi2O3-based EDF. OFC 2003, vol. 2, pp. 635-636, Mar. 2003.*

(Continued)

*Primary Examiner*—John D. Lee
*Assistant Examiner*—Mike Stahl
(74) *Attorney, Agent, or Firm*—Oblon, Spivak, McClelland, Maier & Neustadt, P.C.

(57) ABSTRACT

An optical fiber for optical amplification, characterized in that a full width at half maximum of gain spectrum is 45 nm or more; and a maximum value of power conversion efficiency is 80% or more. A method for producing a rare earth element-doped glass for use in manufacturing the optical fiber, which comprises a deposition step of depositing fine silica glass particles and a co-dopant (a) to prepare an aggregate of fine silica glass particles doped with the co-dopant (a); and a immersion step of immersing the aggregate of fine silica glass particles prepared in the deposition step in a solution containing the rare earth element and the co-dopant (b) to thereby dope the aggregate of fine silica glass particles with the rare earth element component and the co-dopant (b).

23 Claims, 13 Drawing Sheets

U.S. PATENT DOCUMENTS

| | | | |
|---|---|---|---|
| 5,160,521 A * | 11/1992 | Tran | 65/389 |
| 5,246,475 A | 9/1993 | Edagawa et al. | |
| 5,776,222 A * | 7/1998 | Kopylov et al. | 65/384 |
| 6,055,353 A | 4/2000 | Aiso | |
| 6,243,196 B1 * | 6/2001 | Endo et al. | 359/341.3 |
| 6,490,889 B1 * | 12/2002 | Zhang et al. | 65/390 |
| 6,632,758 B1 * | 10/2003 | Beall et al. | 501/10 |
| 6,906,855 B1 * | 6/2005 | Feillens et al. | 359/343 |
| 2002/0027703 A1 * | 3/2002 | Kinoshita et al. | 359/337.1 |
| 2004/0223211 A1 * | 11/2004 | Kakui et al. | 359/341.5 |

FOREIGN PATENT DOCUMENTS

| | | |
|---|---|---|
| JP | 02-018334 | 1/1990 |
| JP | 03-247532 | 11/1991 |
| JP | 06-298542 | 10/1994 |
| JP | 2001-151514 | 6/2001 |
| JP | 2001-274490 | 10/2001 |
| WO | WO 03/033422 | 4/2003 |

OTHER PUBLICATIONS

A. Mori et al. 1.58-um Broad-band erbium-doped tellurite fiber amplifier. Journal of Lightwave Technology, vol. 20 No. 5, pp. 822-827, May 2002.*

B. O. Guan et al. Ultrawide-band La-codoped Bi2O3-based EDFA for L-band DWDM systems. IEEE Photonics Technology Letters, vol. 15 No. 11, pp. 1525-1527, Nov. 2003.*

A Review of the Fabrication and Properties of Erbium-Doped Fibers for Optical Amplifiers, B. James Ainslie, Journal of Lightwave Technology, Feb. 1991, vol. 9, No. 2, pp. 220-227; Fig. 13.

* cited by examiner

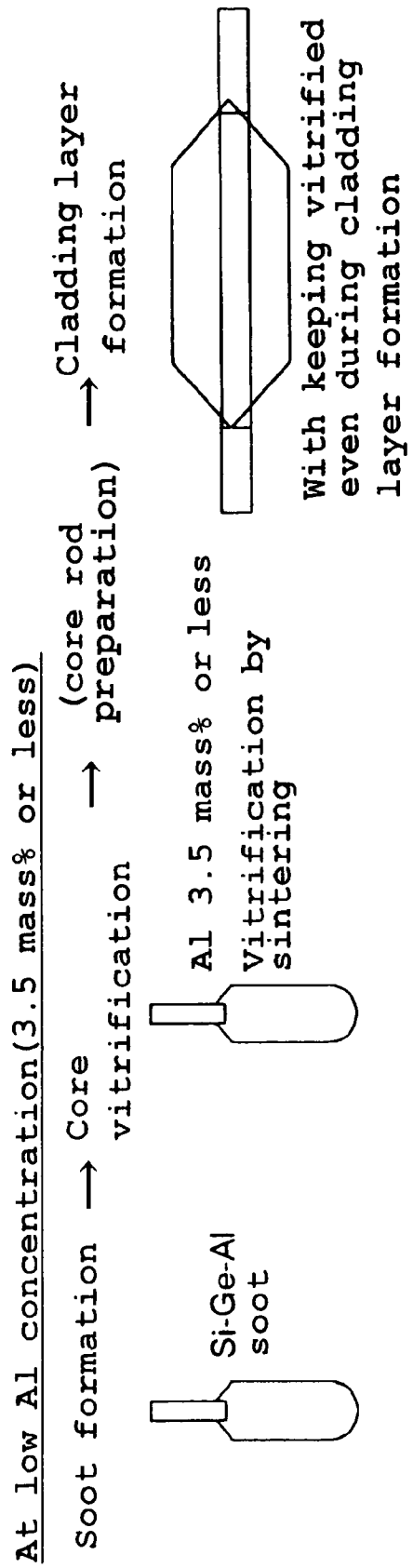

METHOD FOR MANUFACTURING A GLASS DOPED WITH A RARE EARTH ELEMENT AND FIBER FOR OPTICAL AMPLIFICATION USING THE SAME

TECHNICAL FIELD

The present invention relates to a method for manufacturing a rare earth element-doped glass that is mainly used for optical fibers for optical amplification in optical communication.

BACKGROUND ART

With the development of the information society, the volume of communication information tends to increase dramatically. To achieve high speed, large capacity and long distance transmission in optical fiber communication is required and indispensable.

As an approach to such high speed and large capacity transmission, it has been carried out the optimization of characteristics of optical fibers used in optical transmission lines. Further, as another approach for long distance transmission, an optical fiber amplifier (OFA) has been developed, which is capable of amplifying an optical signal as it is by adapting a rare earth element-doped fiber, such as an erbium-doped optical fiber (EDF) formed by doping erbium ions into core of an optical fiber, or the like. With the development of these technologies, the high speed, large capacity and long distance transmission in optical fiber communication has made rapidly progress.

On the other hand, in order to enlarge transmission capacity in optical communication, it has been widely developed a communication by wavelength division multiplex transmission (WDM) for transmitting optical signals having different wavelengths through only one optical fiber. By adapting the OFA to the optical signal system using the WDM transmission, it is expected that the transmission capacity in optical communication can be enlarged and the long distance transmission of optic signals can be achieved.

As a representative example of the OFA, there is an optical fiber amplifier (EDFA) using the EDF. Recently, it was attempted that by using such EDFA, the WDM transmission was carried out under a specific transmission bandwidth having, for example, a wavelength ranging from 1520 to 1620 nm as a gain bandwidth of the EDFA.

When the WDM transmission is carried out by applying the EDFA, it is required to decrease the wavelength dependency of the gain of the EDFA as much as possible. As a technique for practically satisfying this need, it has been known to dope specified elements other than erbium ions, for example, aluminum, to the EDF (Refer to S. B. Poole, "Fabrication of $Al_2O_3$ co-doped optical fibers by a solution-doping technique" ECOC'88, P433, 1988).

Further, in case of carrying out the WDM transmission by using the EDFA, it is also required that the energy conversion efficiency of the EDF is retained as higher as possible. This requirement can be accomplished by increasing the doping amount of erbium. However, it is generally known that, when rare earth ions aggregate, there occurs a degradation of energy conversion efficiency caused by rare earth ions, a so-called concentration quenching. As one example of the technique to prevent such concentration quenching, it is known to combine and dope a $SiO_2$ glass with rare earth oxides and one or both of phosphorus and/or aluminum more than 10 times than the rare earth oxides in a mole ratio relative to the rare earth oxides.

As known from these conventional techniques, it can be understood that an optical fiber doped with the rare earth element and aluminum has good prospects as it improves the amplification characteristics of the EDFA.

Further, in order to dope a silica glass with the rare earth element and aluminum, the following techniques are known:

(1) a technique for immersing an aggregate of fine silica glass particles obtained by a vapor phase deposition method in an alcohol solution prepared by dissolving aluminum chloride and rare earth compound, then heating and sintering the same; and (2) a technique for immersing an aggregate of fine silica glass particles containing aluminum oxides obtained by a vapor phase deposition method in a solution of a rare earth compound, then heating and sintering the same.

However, conventional methods for doping the rare earth element and aluminum to the silica glass have the following problems.

According to the above-mentioned method (1), it is described that the doping of aluminum can be stably conducted. However, when it intends to dope a large quantity of aluminum by this technique, doping amount of the aluminum is limited since the aluminum is not evenly distributed.

Further, according to the above-mentioned method (2), it may be possible to dope plenty amount of aluminum. However, after the silica glass is immersed with the alcohol solution containing dissolved erbium chloride then heated and sintered, the aluminum is not efficiently provided around erbium. Thus, in the case that a large quantity of erbium is doped so that the concentration of erbium in glass can be over 500 mass ppm, it is impossible to completely control the occurrence of concentration quenching.

Additionally, the aggregate of fine silica glass particles doped with aluminum and erbium by the above-mentioned method (1) or (2) is prepared by the following process. That is, the aggregate of fine silica glass particles is heated at 70 to 100° C. under an inert gas atmosphere, dried by evaporating the alcohol component acting as a solvent in the solution contained in the aggregate, and then vitrified into a transparent glass in a high temperature.

Thus, however, by heating at 70 to 100° C. under an inert gas atmosphere, the aggregate is dried by removing alcohol component and then made into a vitrified glass. However, the crystal water cannot be removed sufficiently from the aggregate by the heating at 70 to 100° C. under an inert gas atmosphere. Accordingly, such crystal water or residual solvent component contained in the solution, moisture in the air and the like are rapidly evaporated by rapidly heating the aggregate upon the vitrification process. By such rapid evaporation, the aggregate of fine silica glass particles is damaged to cause a crack. Further, the rapid heating upon vitrification process expands a small crack occurred upon drying the aggregate, and enlarges the crack around the surface after vitrification process.

Further, in consideration of residual percentage, which is a ratio of the amount of co-dopant such as aluminum chloride introduced into the solution to the amount of co-dopant such as aluminum contained in the final glass, there is the following problem. That is, by rapidly exposing the dried aggregate to a high temperature of greater than 1000° C., most of the co-doping substances are volatilized thus the final residual percentage is substantially decreased, thereby causing the deterioration of yield.

Further, in case of utilizing a variety of dopants of various kinds, ability of glass formation of the silica glass is sharply decreased thereby occasionally inducing a change in glass structure in a high temperature treatment or further process.

Especially, when aluminum is doped to an EDF in a great amount, crystals such as cristobalite or mullite generate at such a low temperature that cannot be expected in a typical optical fiber preform.

The use of aluminum vapor doping method enables the doping of a large quantity of aluminum. However, as the doping amount of aluminum becomes larger, it cannot avoid the crystallization to be occurred in the same process as for the typical optical fiber preform, and due to the resulting bubbles or so on caused by crystals, it is difficult to make the optical fiber preform.

Accordingly, it is an object of the present invention to provide a stably doping means for doping a glass with a large quantity of a rare earth element and dopants for improving the functionality of the rare earth element.

Other and further features and advantages of the invention will appear more fully from the following description, taken in connection with the accompanying drawings.

BRIEF DESCRIPTION OF THE DRAWINGS

FIGS. 8(a) to 8(c) are schematic views showing a condition of core rod according to respective processes of forming a cladding layer;

DISCLOSURE OF THE INVENTION

Figure 1:
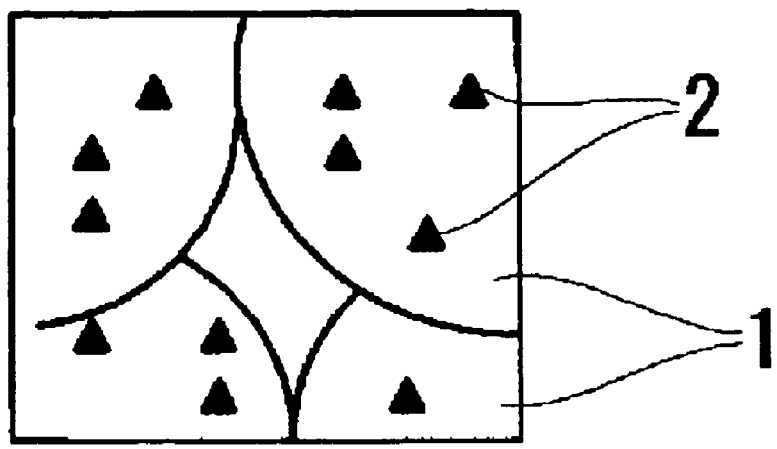
FIGS. 1(a) to 1(c) are schematic views showing glass compositions of Examples 1 to 4, which are obtained by one example of the method for manufacturing the rare earth element-doped glass of the present invention according to individual production processes, respectively.
Figure 1:
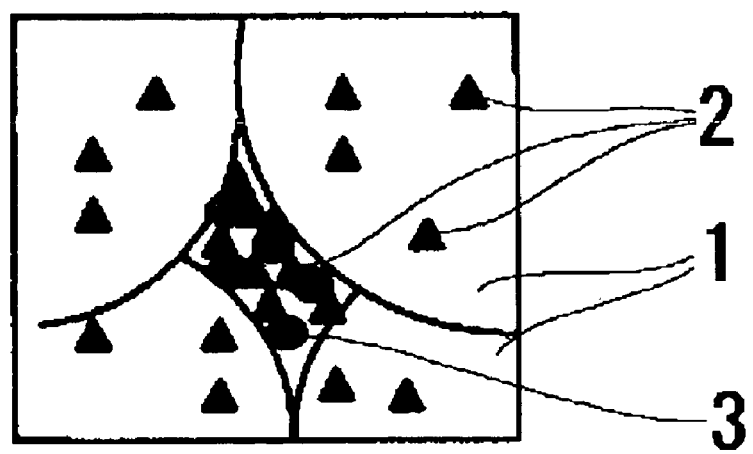
Figure 1:
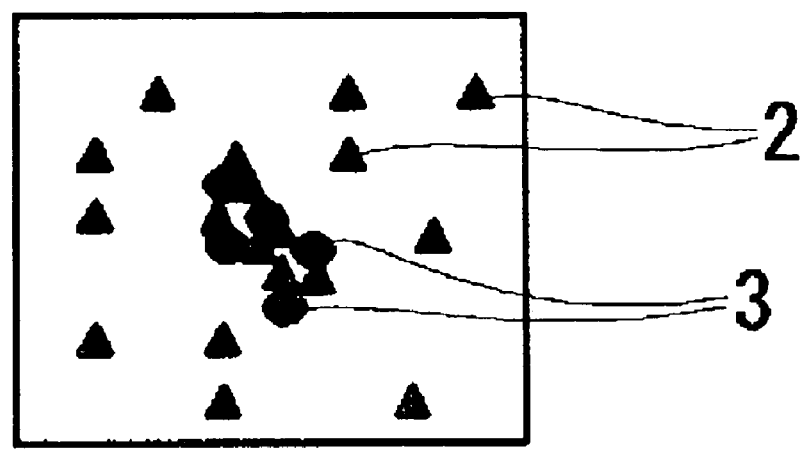
Figure 2:
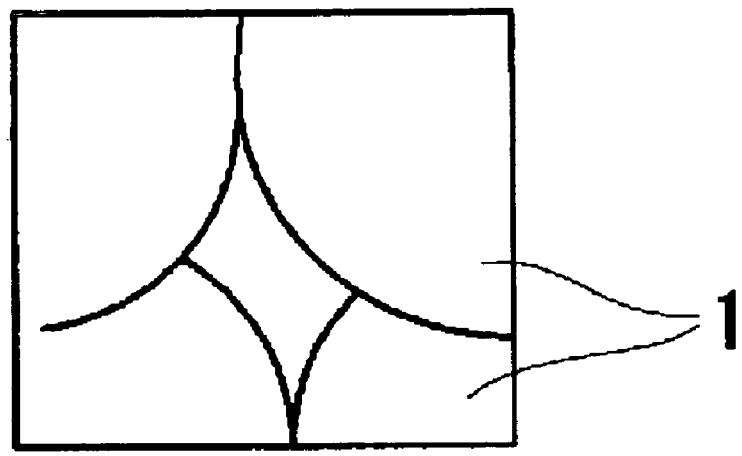
FIGS. 2(a) to 2(c) are schematic views showing glass compositions of Comparative Examples 1, 3 and 4, which are obtained by the conventional method for manufacturing the rare earth element-doped glass only by using a solution doping method according to individual production processes, respectively.
Figure 2:
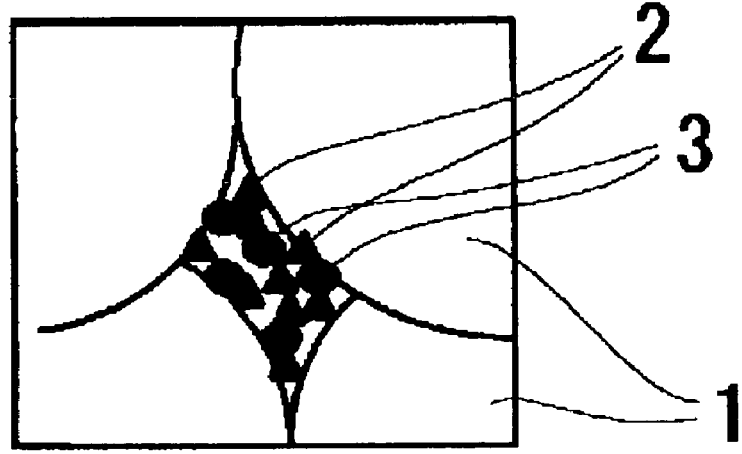
Figure 2:
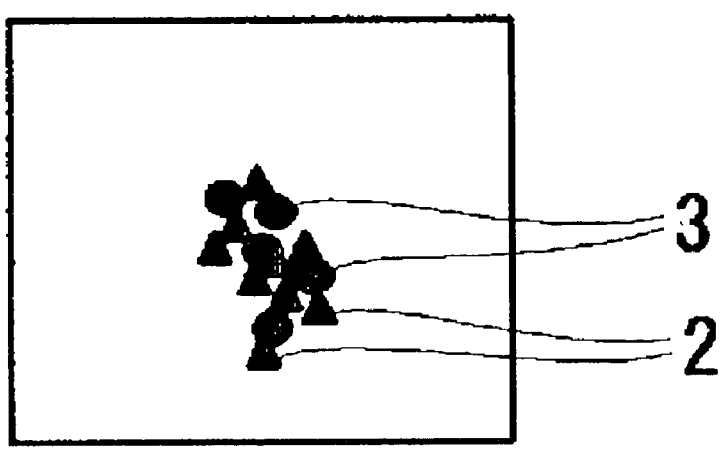

According to the present invention, there are provided at least one of the following means:

An optical fiber for optical amplification, characterized in that a full width at half maximum of a gain spectrum is 45 nm or more; and a maximum value of power conversion efficiency is 80% or more.

A method for manufacturing a rare earth element-doped glass for use in manufacturing an optical fiber for optical amplification wherein the optical fiber has a full width at half maximum of a gain spectrum of 45 nm or more, and a maximum value of power conversion efficiency of 80% or more, which comprises depositing fine silica glass particles obtained by reacting a silica glass material and a co-dopant (a) obtained by reacting a raw material for the co-dopant (a) to prepare an aggregate of fine silica glass particles doped with the co-dopant (a), and immersing the aggregate of fine silica glass particles doped with the co-dopant (a) in a solution containing the rare earth element and the co-dopant (b) for doping the rare earth element and the co-dopant (b) to the aggregate of fine silica glass particles doped with the co-dopant (a).

A method for manufacturing a rare earth element-doped glass used in manufacturing an optical fiber for optical amplification wherein the optical fiber has a full width at half maximum of a gain spectrum of 45 nm or more, and a maximum value of power conversion efficiency of 80% or more, which comprises polishing a silica glass rod so that a maximum roughness (Ry) of the outer circumferential surface is not more than 0.5 μm by mechanical means, cleaning the polished silica glass rod, and then forming a glass layer on outer circumferential surface of the silica glass rod.

A method for manufacturing a rare earth element-doped glass used in manufacturing an optical fiber for optical amplification wherein the optical fiber has a full width at half maximum of a gain spectrum of 45 nm or more; and a maximum value of power conversion efficiency of 80% or more, which comprises heating a glass rod with at least partially containing crystals at a temperature higher than a glass formation temperature, and cooling the glass rod under a cooling speed faster than a cooling speed in which the crystals can be extracted from the glass.

A rare earth element-doped glass used in manufacturing an optical fiber for optical amplification wherein the optical fiber has a full width at half maximum of a gain spectrum of 45 nm or more; and a maximum value of power conversion efficiency of 80% or more, wherein a diameter of a glass rod having at least partially containing crystals is not less than 5 mm, and comprising a rare earth element and an aluminum compound, wherein the concentration of aluminum is not less than 3.5 mass %.

A method for manufacturing an optical fiber for optical amplification wherein the optical fiber has a full width at half maximum of a gain spectrum of 45 nm or more; and a maximum value of power conversion efficiency of 80% or more, which comprises drawing a glass rod with at least partially containing crystals.

BEST MODE FOR CARRYING OUT THE INVENTION

The present invention will be described in further detail as follows.

A fiber for optical amplification of the present invention exhibits a full width at half maximum (FWHM) of a gain spectrum (g*(dB/m)) of 45 nm or more, preferably, 47 nm or more, more preferably, 49 nm or more, and a maximum value of power conversion efficiency of 80% or more, preferably 82% or more, more preferably, 85% or more. For the fiber for optical amplification of the present invention, the full width at half maximum is generally 55 nm or less, and a maximum value of power conversion efficiency of generally 95% or less.

In the present invention, the maximum value of power conversion efficiency is referred to as a value obtained by the following formula:

Maximum value of power conversion efficiency=
$[Ps^{out} - Ps^{in}]/Pp^{in}$ wherein $Ps^{out}$ is an intensity of an output signal light in a cross section of the fiber for optical amplification (for example, EDF), $Ps^{in}$ is an intensity of an input signal light in the cross section of the fiber for optical amplification, and $Pp^{in}$ is an intensity of a pumping light in the cross section of the fiber for optical amplification.

Figure 9:
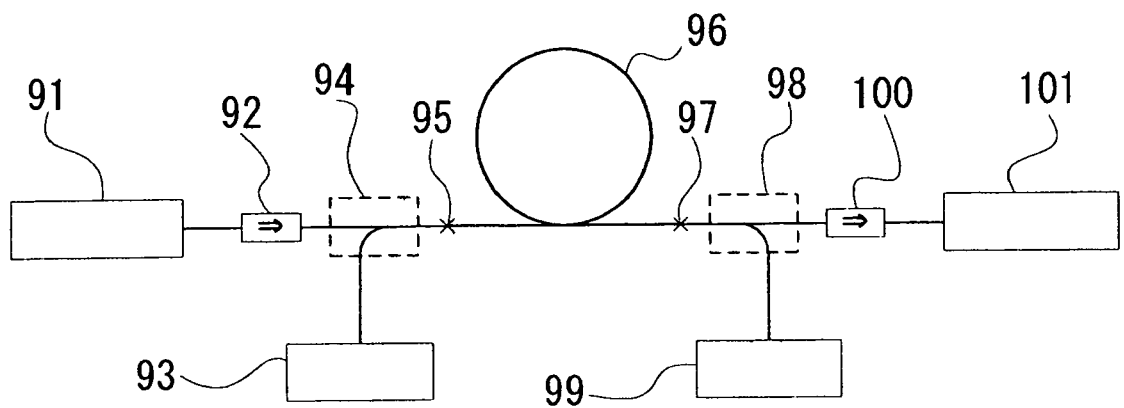
FIG. 9 is a schematic view showing a method for measuring a power conversion efficiency.

The intensity of these optical lights can be measured by using a measuring system shown in FIG. 9.

In the present invention, the co-dopant is referred to as a component except for the rare earth element, with which the rare earth element-doped silica glass is doped.

Hereinafter, the co-dopant (a) selected from an element group (A) and the co-dopant (b) selected from an element group (B) will be explained below.

An element for controlling gain spectrum of the rare earth element constituting the element group (A) is referred to as, for example, an element to flatten the gain spectrum.

An element for controlling energy conversion efficiency of the rare earth element constituting the element group (B) is referred to as, for example, an element to prevent occurrence of the concentration quenching by aggregation of the rare earth elements such as Er, etc.

Although the co-dopant (a) selected from the element group (A) is doped simultaneously with the formation of an aggregate of fine silica glass particles, it is possible to dope a large amount of dopant compared to the rare earth element. In consideration of the relationship with specific characteristics required for the rare earth element-doped glass, as the co-dopant (a), aluminum is preferred. Further, as the co-dopant (a), can be used phosphorus, boron, etc. besides aluminum. The co-dopant (a) can be doped at generally 0.1 to 8 mass %, preferably, 1.5 to 5 mass % relative to the rare earth element-doped glass.

The co-dopant (b) selected from the element group (B) is doped simultaneously with the rare earth element, and it is preferred to adapt a so-called solution doping method. As a concrete example of the co-dopant (b), can be mentioned aluminum, lanthanum, etc. Further, in consideration of the relationship with specific characteristics required for the rare earth element-doped glass, aluminum is a preferred co-dopant (b). Generally, a method of doping with aluminum as the co-dopant may comprise a method for dissolving $AlCl_3$ into a solution of the rare earth element. Besides, the method includes doping methods by using a hydrate of $AlCl_3$ or dispersing fine particles of aluminum into a solution of the rare earth element. The co-dopant (b) can be doped at generally 0.1 to 5 mass %, preferably, 0.1 to 1.5 mass % relative to the rare earth element-doped glass.

That is, the co-dopant (a) and the co-dopant (b) preferably contain aluminum.

The overall doping amount of the co-dopants (a) and (b) are generally 0.1 to 8 mass %, preferably 1.5 to 5 mass % relative to the rare earth element-doped glass. In this case, the mixing ratio of co-dopant (a) to co-dopant (b) is generally 20:1, preferably 15:1.

Though not specifically limited, in case that it intends to set a gain wavelength band within a range of 1520 nm to 1620 nm, erbium (Er) as the rare earth element is preferably used. In case of corresponding to another wavelength band different from the above range, ytterbium (Yb), thulium (Tm), neodymium (Nd), etc. can be used. It is possible that the rare earth element component is doped at generally 0.02 to 0.5 mass %, preferably 0.05 to 0.3 mass % relative to the rare earth element-doped glass.

Further, in case of using erbium as the rare earth element, in order to increase the doping amount of erbium without occurring the so-called concentration quenching, it is more preferable to co-dope the rare earth element except for erbium, such as ytterbium (Yb) and lanthanum (La), as the co-dopant (b). In this case, as for the rare earth element except for erbium, type and doping amount of the element are determined in consideration of the characteristics of the rare earth element-doped glass obtained according to the present invention.

Next, the method for manufacturing the glass doped with a rare earth element of the present invention will be explained more in detail.

The first step is a deposition process of depositing fine silica glass particles obtained by reacting a silica glass raw material, and the co-dopant (a) obtained by reacting raw material of the co-dopant (a) so as to have a diameter of 5 mm or more and a thickness of 2.5 mm or more after sintering them to a deposition target to prepare an aggregate of the fine silica glass particles doped with the co-dopant (a). Herein, as the co-dopant (a), aluminum is preferred as described above. For example, in case of the MCVD (modified chemical vapor deposition (CVD)) method, soot is deposited inside a glass tube. In the VAD (vapor-phase axial deposition) method, the soot is deposited in an axial direction of a target rod. The OVD (Outside vapor deposition) method is to deposit the soot in a diametrical direction of the target rod. With the MCVD method, thickness of glass is limited to a few mm, while, in the OVD method and the VAD method, it is easy to make a glass preform of Φ40 mm or more.

The second step is a immersion process of immersing the aggregate of fine silica glass particles doped with the co-dopant (a) prepared in the first depositing step in a solution containing the rare earth element and the co-dopant (b) to thereby dope the aggregate of fine silica glass particles already doped with the co-dopant (a) with the rare earth element and the co-dopant (b). The solution used in the solution doping method includes methanol, ethanol, water, hydrochloric acid, etc.

Herein, as the co-dopant (b), aluminum is preferred as described above. Further, if the concentration of the co-dopant (b) in the solution is too high, a viscosity of the solution becomes larger to thereby increase the time of immersing treatment. Thus, it is preferable that the concentration of the co-dopant (b) among the solution is not more than 2 mol % in the case that methanol is used as the solvent.

Thereafter, the step of drying and removing the solvent component in the solution doped in these aggregates is carried out, for example, by a method such as heating, and the rare earth element and the co-doped element contained in the dried aggregate are oxidized and then the aggregate is dehydrated and sintered at a high temperature. The oxidization step is a step that is carried out under an oxygen-containing atmosphere, and the atmospheric temperature is slowly increased from about normal temperature until the temperature at which the rare earth element and the co-doped element are completely oxidized.

Herein, the slow increase of the temperature is required from a viewpoint of suppressing occurrence of crack due to moisture or the like contained in the dried aggregate of fine silica glass particles. At this time, a temperature-changing rate is preferably about +30 to 150° C. per one hour, more preferably 40 to 100° C. per one hour.

Especially, at the initial stage of heating the aggregate of fine silica glass particles, specifically, as for the heating from around a room temperature to the range of 200 to 300° C., in order to suppress the effect of a poor heat conductivity of the aggregate to the minimum, it is preferable to increase the temperature as slowly as possible, so that a temperature-changing rate can be about +30 to 240° C. per one hour. Afterwards, it is relatively fine even if a temperature-changing rate is increased up to, for example, about 600° C. per one hour.

The upper limit temperature of the oxidization step is about 1200° C. If the temperature is too high, the density of the aggregate becomes higher than necessary, thereby making it difficult to efficiently carry out the dehydration in the next dehydration step. The oxygen-containing atmosphere in the oxidization step is referred to as an air, a mixed gas of an inert gas such as He, Ar, etc. and $O_2$, an oxygen gas, and the like. Therefore, the dehydration step is carried out under a chlorine-containing inert gas atmosphere, and the sintering step is carried out substantively under an atmosphere of only an inert gas.

Further, in the oxidization step, it is preferred to include a crystal water removal step of removing crystal water contained in at least one of the rare earth element component and the co-doped element component doped by the immersing step (the rare earth element-doping step).

Figure 7:
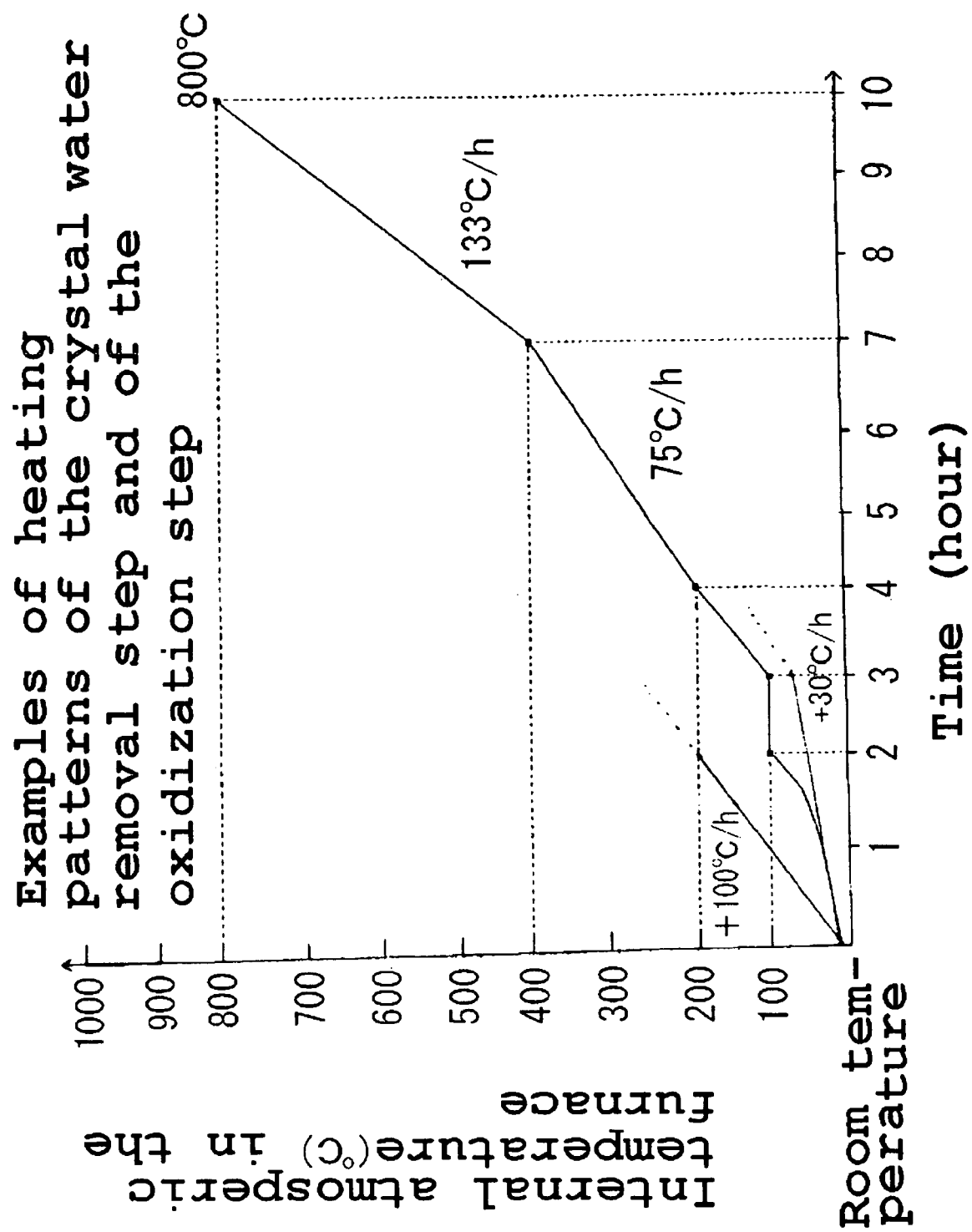
FIG. 7 is a view showing a temperature elevation rate in an oxidization process.

This crystal water removal step is preferably, under an atmosphere containing oxygen, a step of slowly increasing the atmospheric temperature from nearly a room temperature until the temperature at which crystal water is completely removed. FIG. 7 illustrates an example of temperature elevation pattern in such crystal water removal step and the oxidization step.

Referring to the graph of FIG. 7, an area of 200° C. or less is a crystal water removal (releasing) treatment region (oxygen atmosphere) and another area ranging from 200° C. to 800–1000° C. is an oxidization treatment region (oxygen atmosphere).

Further, though the temperature at which the crystal water is completely removed is 100° C. or more at an atmospheric pressure, it is preferred to carry out the removal at a vaporization temperature of a co-doped element or less. For instance, in the case that aluminum chlorides are used as the co-doped element components, it is preferred to carry out the removal at a temperature (about 130° C. at an atmospheric pressure) at which the vaporization of aluminum chloride occurs or less. The temperature of sublimation point of aluminum chloride (about 182° C. at an atmospheric pressure) becomes the upper limit of the above temperature.

Further, the aggregate has a poor heat conductivity. Thus, especially in the crystal water removal step, in order to prevent the occurrence of crack, there is a need for increasing the atmospheric temperature of the aggregate so that the surface and the internal temperature of the aggregate are almost the same. Further, it is necessary that almost the same heat radiation history is achieved in a longitudinal direction of the aggregate as well as a diameter direction of the aggregate.

Due to this, the heating means such as a heater is controlled so that the temperature in a furnace is almost constant, in at least a portion in the furnace. Further, it is preferred that the aggregate is arranged in the portion where the temperature is almost constant and the entire aggregate is slowly heated or kept at an almost the same temperature. Hence, it is natural that there is a need for changing the increasing rate due to size of the soot.

At this time, the temperature-changing rate has to be slower than the temperature-changing rate in the oxidization step. The average temperature-changing rate, per one hour, is generally about +10 to 120° C., preferably about +10 to +80° C., more preferably about 10 to 60° C.

Figure 12:
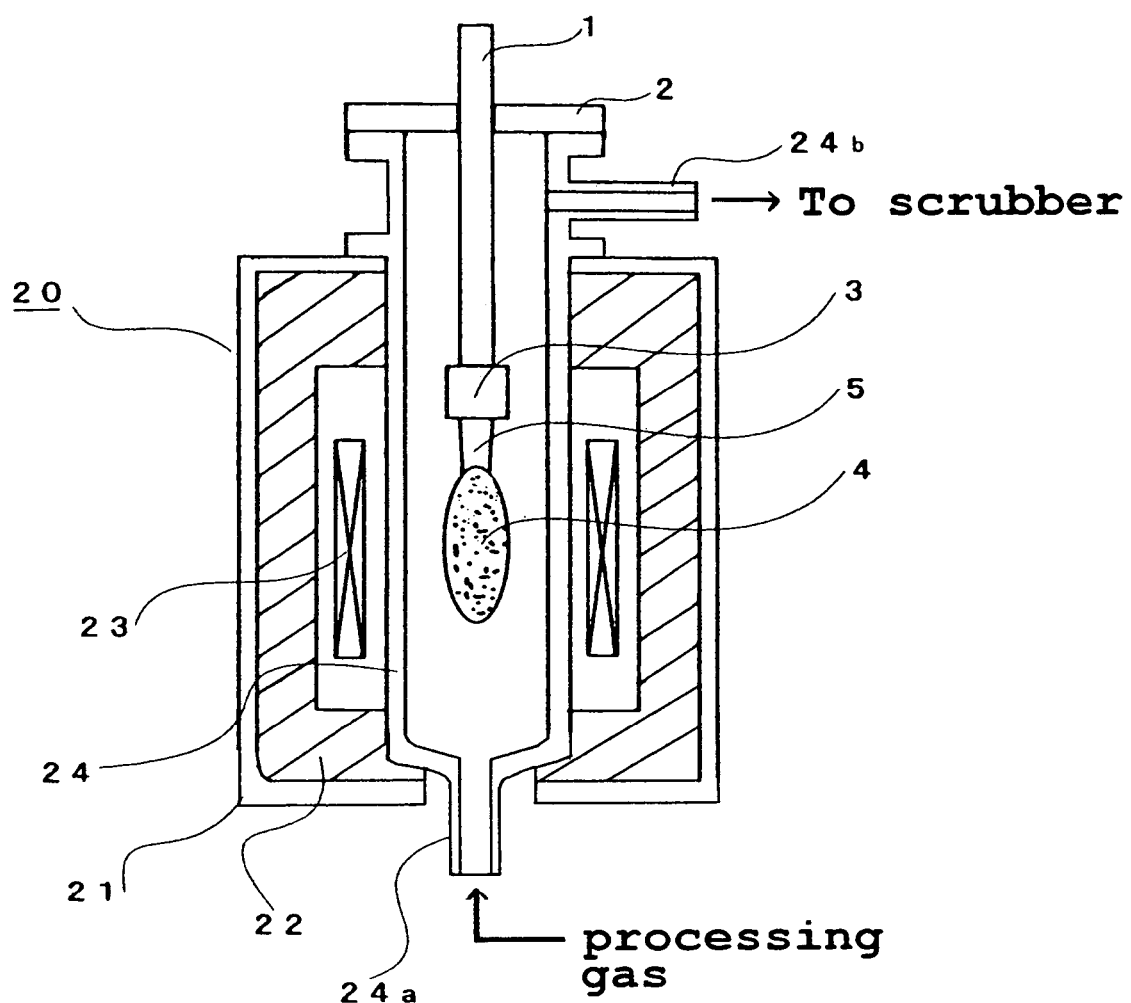
FIG. 12 is a schematic view of an oxidization treatment apparatus.

In the present invention, though the oxidization treatment apparatus used in the oxidization step is not specifically limited, but, for example, may include the apparatus as shown in FIG. 12.

In the drawing, 1 represents a lift axis (quartz) by which the aggregate of fine silica glass particles subject to oxidization treatment is lifted up and pulled down, 2 represents an upper cover, 3 represents a holding portion of the following 4, 4 represents the aggregate of fine silica glass particles (soot) containing the rare earth element by solution doping method, and 5 represents a target rod (starting rod). 20 represents a furnace (oxidization treatment furnace) heating the aggregate of fine silica glass particles (soot). This furnace 20 comprises an oxidization treatment furnace 21, and has a muffle tube (quartz) 24 heated by a thermal insulating material 22 and a heater 23. 24a represents a processing gas (oxygen-containing gas) inlet portion of the furnace central tube and 24b represents a vent pipe.

In the above preferred embodiment, the content of aluminum compound in the aggregate of fine silica glass particles is not specifically limited, but is generally 10 mass % or less, preferably 1.5 to 8 mass %.

In the dehydration and sintering steps after the oxidization treatment, the dehydration is carried out preferably at 1000° C. or more, and the sintering is carried out preferably at 1400 to 1700° C., for example, under a helium-containing atmosphere.

The aggregate of fine silica glass particles manufactured by the above process undergoes a dehydration step and the like and then sintered to thereby obtain a core rod. The core rod is not limited to the glass phase core rod. Further, in at least one of the dehydration step and the sintering step, it is possible to dope the rare earth element-doped glass with fluorine by adding an atmospheric gas with fluorine.

Figure 8B:
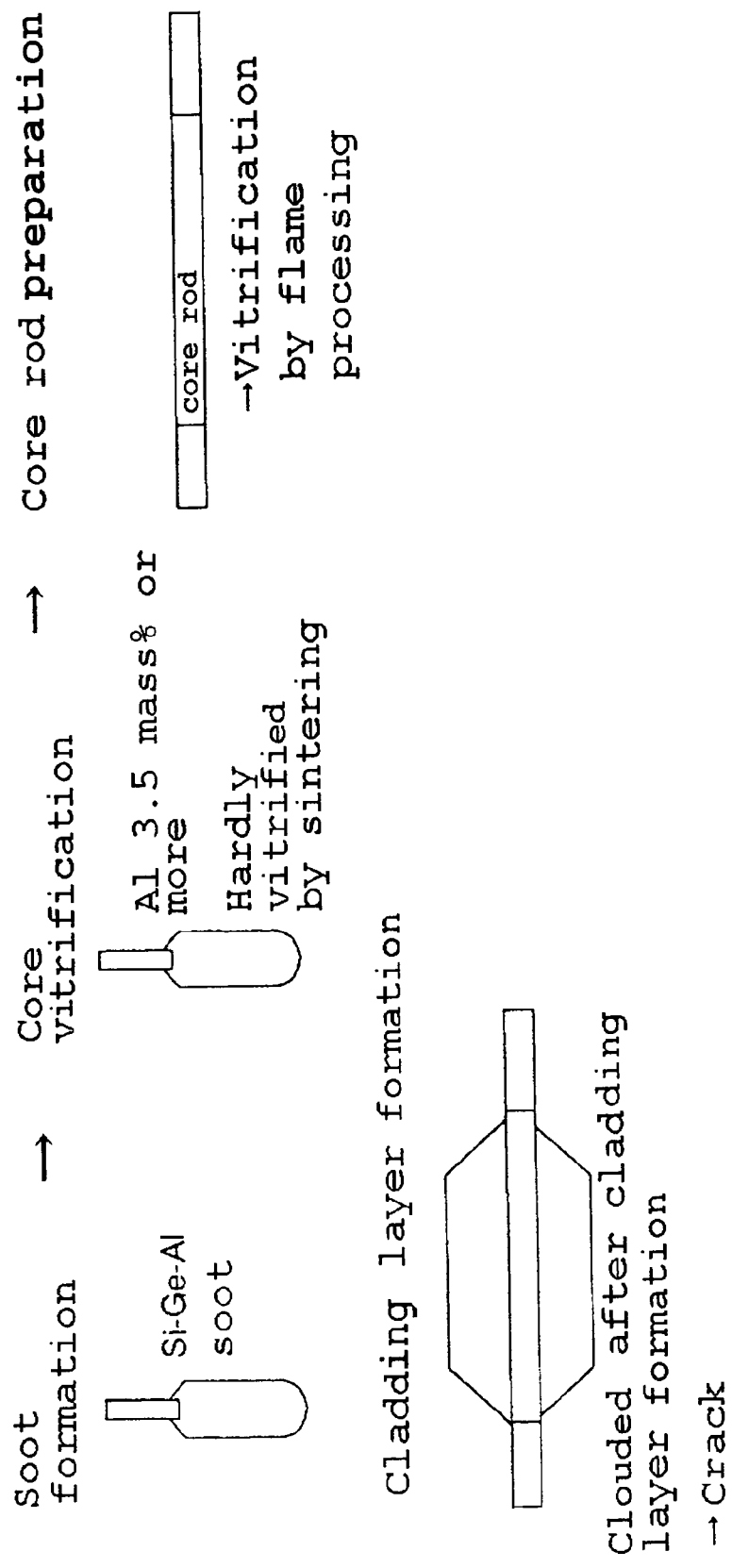

If the doping amount of aluminum is, for example, 3.5 mass % or more, the core rod may easily be clouded caused by the aluminum in the core rod. In a conventional clouded case, it has been thought that, if a clouded portion is not removed, the obtained glass cannot be used for the purpose of the fiber for optical amplification. As shown in FIG. 8(*a*), if the doping amount of aluminum is about 3.5 mass %, the core rod becomes a vitrified glass by a strong heating with a flame of a glass working lathe and a quenching. However, as shown in FIG. 8(*b*), if the doping amount of aluminum is 3.5 mass % or more, core rod is not vitrified unless a diameter and thickness of the core rod is decreased about 7 mm or less and about 3.5 mm or less, respectively, and unless the strong heating and the quenching are carried out. At this time, the cooling speed is about 350° C./sec. Even if vitrified, the core rod may be easily clouded again by a heating in the post process. In this case, the core rod becomes finer in diameter to have approximately a 5 mm diameter and a 2.5 mm thickness and kept vitrified even in further process. In contrast, in case of the VAD method and/or OVD method, if the core rod becomes too much finer in diameter, it becomes difficult to form the cladding layer, thereby not being able to endure from a practical requirement. At this time, the cooling speed is about 400° C./sec. In case of an internal deposition method such as the MCVD method, since the thickness of the core layer can be smaller, thus a post-treatment process can be performed in a vitrified state. But in case of a preform having the maximum diameter (about 50 mmΦ) in a current state, the cooling speed is generally 50° C./sec or more, therefore it is difficult to vitrify by heating and quenching.

In a word, it is possible to vitrify an aluminum-doped aggregate of fine silica glass particles, with which doping amount of aluminum is 3.5 mass % or more, by heating and quenching if it has an outer diameter of 3 to 20 mm. But the smallest diameter with which a cladding layer can be formed is 5 mm. On the other hand, if the diameter is larger than 5 mm, the preform is clouded again by heating in a vitrification process of the cladding, thereby causing bubbles or cracks.

Figure 8C:
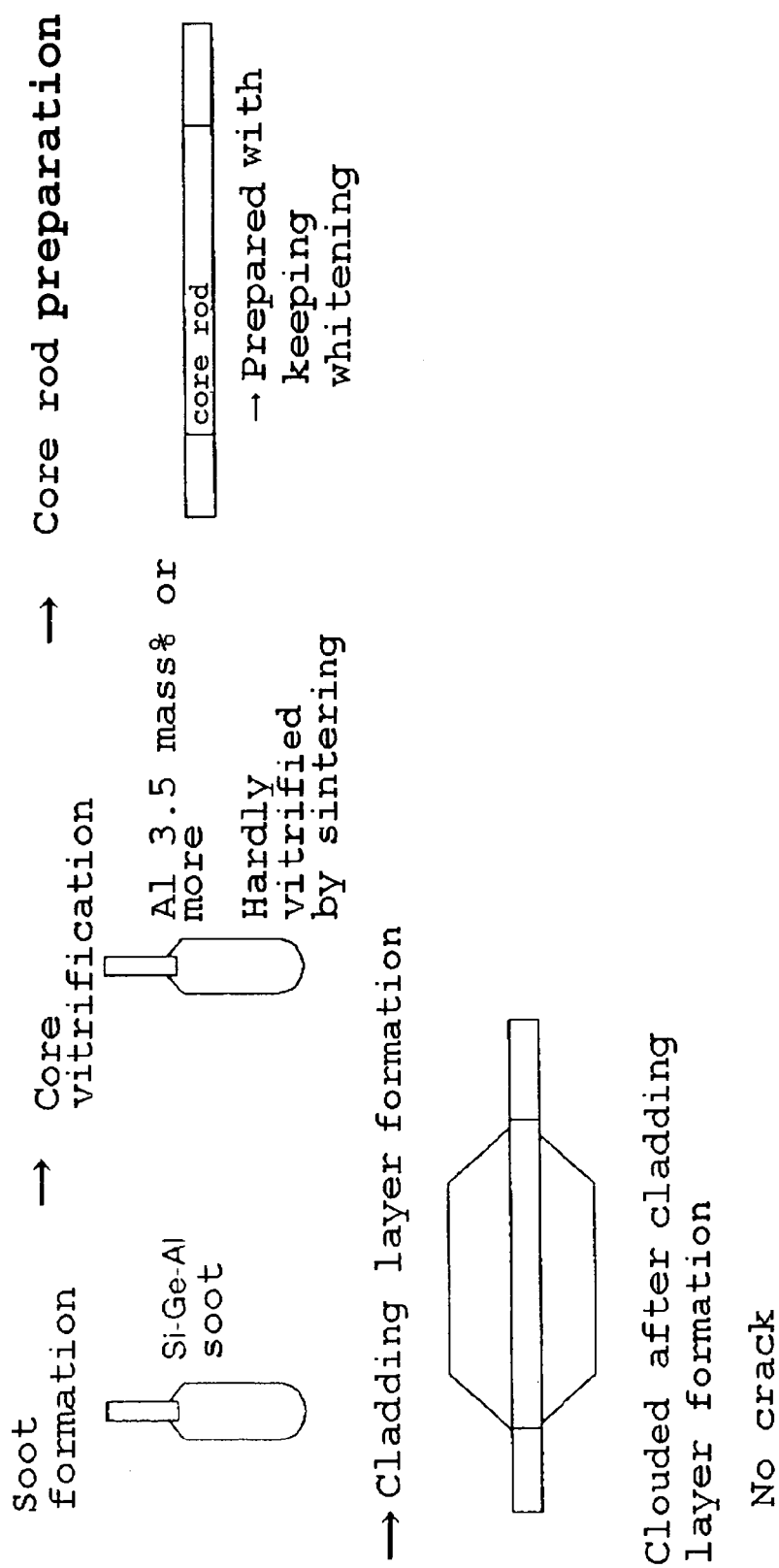

Therefore, in the present invention, the above problem has been solved by forming the cladding layer on the core rod having a high concentration of aluminum being clouded and crystallized, as shown in FIG. 8(c).

When the forming of a cladding layer is performed on the core rod being clouded, bubble or crack can be suppressed at a large extend without having a big change in volume due to a structure change and a phase change in the dehydration or sintering treatment upon forming the cladding layer. The clouded core is finally made to be transparent by drawing. At this time, both of the cladding and the core are degraded in viscosity to a large extend, and thus the effect of a volume change can be canceled, whereby there is almost no bubble occurred. In addition, by drawing, the diameter becomes very small, thus the calorific capacity is sharply degraded. Thus, the quenching at the minimum of about 1000° C./sec can be performed and accordingly the cladding and core can be made into an optical fiber as it is in a vitrified state.

Since the cloud of these core glasses is mainly caused by a phase transition or crystallization, the core glass has a remarkable variation in properties by phase transition or crystallization. Especially, in the case that the concentration of aluminum is 3.5 mass % or more, though it differs according to amount of the dopant, the generated phase is mainly composed of mullite and the density thereof is larger than that of silica glass, thereby reducing overall volume of the core. In addition, since the concentration of aluminum is high, the thermal stability of an aluminum-doped silica glass is fairly low and becomes clouded in the heat treatment for a long time upon forming the cladding layer. In contrast, if the concentration of aluminum is 3.5 mass % or less, the generated phase is mainly composed of cristobalite and the linear expansion coefficient is large, thereby enlarging the overall volume.

Furthermore, when the cooling speed is set higher than the value expressed by the following formula, a glass rod becomes a vitrified state.

cooling speed (° C./sec)=−178×ln(r)+618 wherein r is the glass rod radius (mm)

On the other hand, when the radius of the glass rod is set smaller than the value expressed by the following formula, a glass rod becomes a vitrified state.

glass rod radius (mm)=EXP{−(S−618)/178} wherein S is the cooling speed (° C./sec).

The thusly-obtained rare earth element-doped glass is elongated to reach a proper diameter, for example, after a silica-based glass layer is formed around, thereby becoming the final rare earth element-doped optical fiber. This optical fiber is utilized as an optical fiber for optical amplification, an optical fiber laser, etc.

EXAMPLES

Hereinafter, the present invention will be described concretely with reference to examples, but the present invention is not limited thereto. Herein, the method for embodying the present invention by the VAD method will be explained, but it is natural that this method can be adapted to other methods, such as the OVD and MCVD methods, for obtaining an aggregate of fine silica glass particles in a production process.

Figure 5:
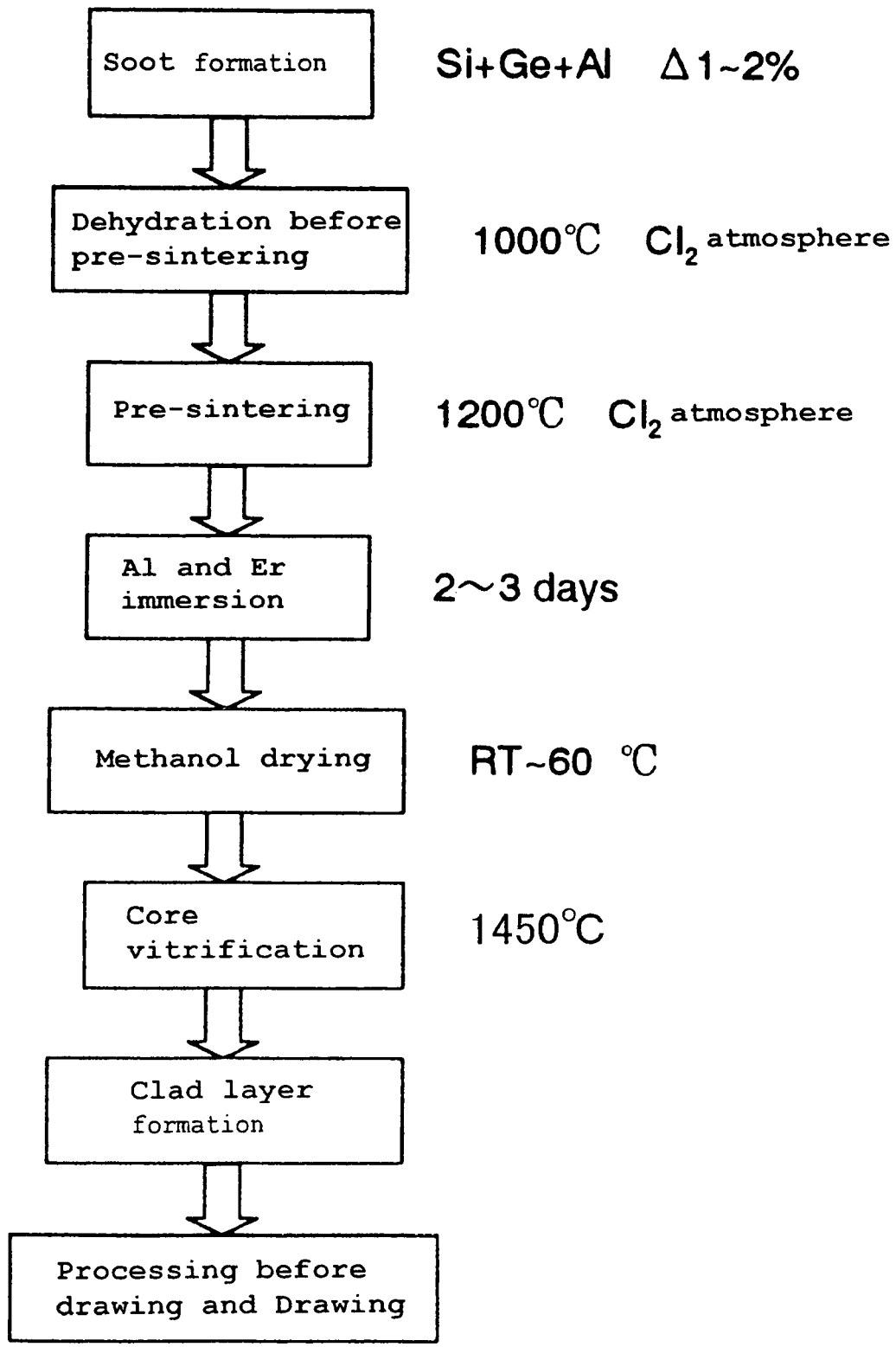
FIG. 5 is a flow chart of a process according to one embodiment of the method of the present invention.
Figure 6:
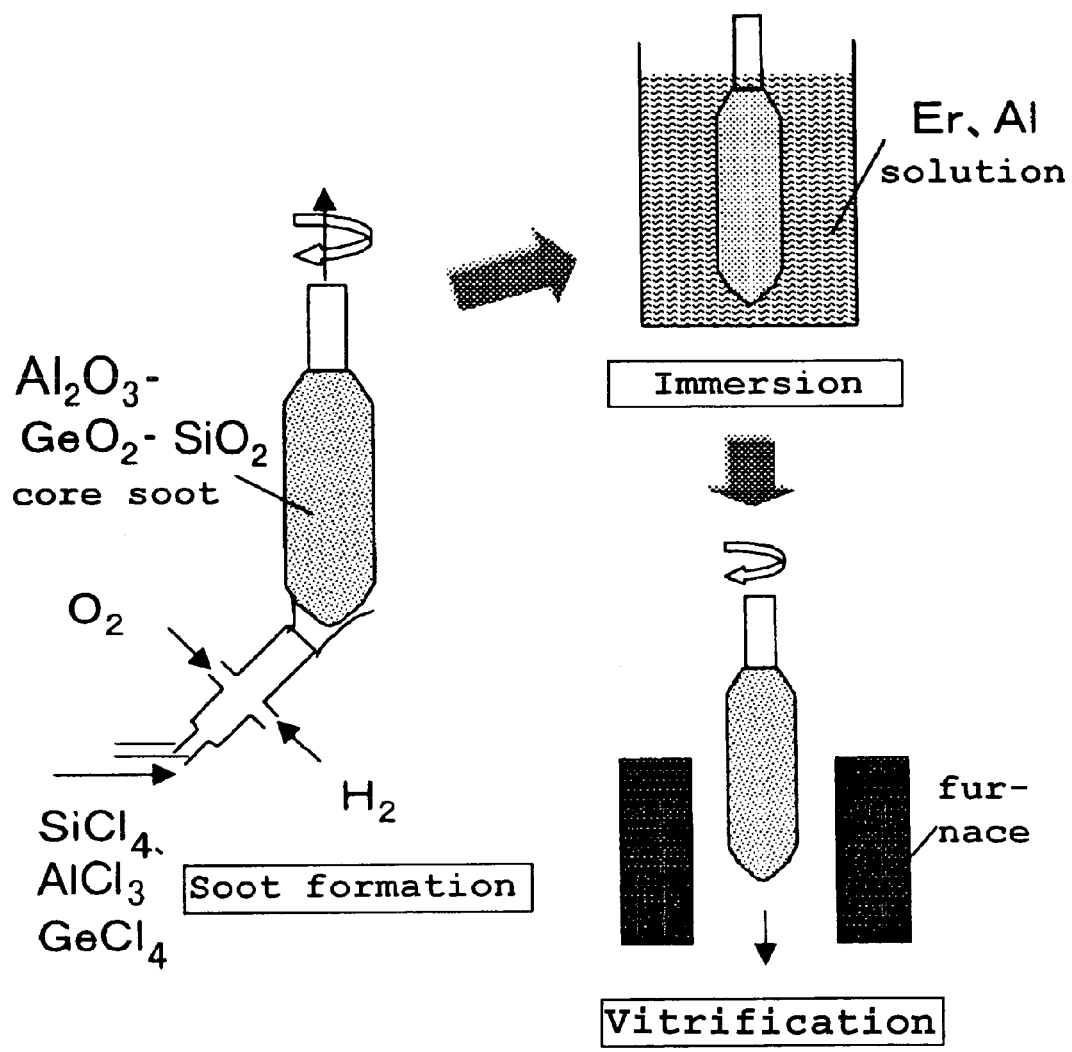
FIG. 6 is a schematic explanatory view on parts of the process of FIG. 5.

FIGS. 5 and 6 show representative process typical flow charts of the production of the rare earth element-doped glass.

Firstly, $SiO_2$ fine particles obtained by flame hydrolysis of $SiCl_4$, $GeO_2$ fine particles obtained by flame hydrolysis of $GeCl_4$, and $Al_2O_3$ fine particles obtained by flame hydrolysis of $AlCl_3$ are deposited to a target rod (starting rod), which is a deposition target, to thereby prepare an aggregate of fine silica glass particles doped with aluminum by the VAD method. The thickness of a radius directional of soot (the radius or the thickness of the soot deposited to the rod) is 2.5 mm or more. Herein, change of the supply amount of $AlCl_3$ enables to dope the aggregate of fine silica glass particles with aluminum having the maximum of about 8 mass %.

Next, the aggregate of fine silica glass particles doped with aluminum obtained by the VAD method is immersed in a methanol solution of $ErCl_3$ and $AlCl_3$, then undergoes a drying step, an oxidization step, a dehydration step and a sintering step, to thereby prepare a rare earth element-doped glass doped with erbium and aluminum.

Further, in order to confirm the effect of the oxidization step carried out after the immersion step, the result of measuring the residual rate of erbium and aluminum in a production process without passing through the oxidization step will be shown in Table 1. The result is represented by a relative ratio of the residual rates of the erbium and the aluminum. Here, the residual rate is referred to as the ratio (atomic ratio) of the amount of erbium or aluminum remained in the rare earth element-doped glass obtained after completing the sintering process of the erbium or aluminum introduced into the methanol solution in the immersion step. Additionally, the residual ratio is referred to as the ratio (atomic ratio) representing the residual rate in a production process with the oxidization step relative to the residual rate in the production process without passing through the oxidization step, which is set to 1.

TABLE 1

| | Oxidization step used | No oxidization step used |
|---|---|---|
| Composition of aggregate of fine glass particles | Substantively $SiO_2$ $GeO_2$ $Al_2O_3$ | |
| Bulk density | In the place finally becoming the effective portion, it is made uniform at about 0.5 g/cm³. | |
| Concentration of solution in the immersion step (relative to ethanol) | 6 hydrates of erbium chloride at about 0.2 mass % 6 hydrates of aluminum chloride at about 18 mass % | |
| Drying condition | Drying under a clean nitrogen atmosphere of almost a room temperature | |

TABLE 1-continued

|  | Oxidization step used | No oxidization step used |
|---|---|---|
| Oxidization condition 1 (crystal water removal step) | Increase up to 100° C. from room temperature at about 20° C./hr, and then increase up to about 130° C. at about 5° C./hr. | Not executed |
| Oxidization condition 2 (in addition to the crystal water removal step) | Keeping increase from about 130° C./hr up to about 900° C. at about 150° C./hr, after the crystal water removal step | Not executed |
| Dehydration condition | About 1000° C. × 5 hours | |
| Sintering condition | About 1350° C. × 5 hours | |
| Residual ratio of erbium (atomic ratio) | 1.8–2.3 | 1 |
| Residual ratio of aluminum (atomic ratio) | 2.0–2.4 | 1 |

As clarified from the result of Table 1, by carrying out the oxidization step, erbium and aluminum doped in the preform during the immersion step are not be volatilized in the dehydration and sintering steps, or the amount of volatilization is reduced to a large extent, thus making it possible to perform high concentration doping effectively.

Additionally, as for the rare earth element except for erbium, $YbCl_3$ or $LaCl_3$ was additionally dissolved in the methanol solution, thereby preparing the rare earth element-doped glass.

Herein, practical examples of the doping amount of erbium and aluminum when varying the concentration of aluminum will be shown in Table 2. Further, the doping amount of erbium is set to 0.1 mass % in consideration of the characteristics required for the rare earth element-doped glass.

Further, the doping amount of each element (component) is represented by the doping amount in the prepared rare earth element-doped glass.

In the sintering step (core vitrification step), the thusly obtained rare earth element-doped glass was not forcedly vitrified at 1400° C. to 1450° C., but sintered and imperforated to thereby prepare a core glass. A high temperature may enable vitrification, but there is a possibility that the core rod would be elongated in the furnace. After the completion of the vitrification of the core glass, it may be vitrified or clouded. However, it is necessary that the core glass is imperforated, thus, if there is no fluorine, the temperature is generally 1350 to 1500° C., preferably 1400 to 1450° C., while including fluorine, the temperature is generally 1200 to 1300° C., preferably 1230 to 1270° C.

This core glass was elongated and mechanically polished to produce a core rod. The diameter of the core rod was set to 10 mm. In the case that the surface is glass, the core rod can be made by flame polishing. Further, in the case that the core glass surface gets rough due to crystallization or the like, the core rod can be made also by mechanical polishing. In the case that the core rod was vitrified by flame polishing or the like, the entire core glass was clouded by proper annealing. The upper limit of the annealing temperature is generally 1300° C. or less, preferably 1250° C. or less, in order to prevent the core rod from elongating. The annealing time is generally one hour or more, preferably 4 hours or more. In the case of mechanically polishing the surface, the maximum roughness of the surface is generally 0.5 μm or less, preferably 0.2 μm or less.

Further, in the present invention, the maximum roughness (Ry) and average roughness (Ra) of the surface of the glass rod is consistent with the definition of a surface roughness defined in "JIS B 0601-1994".

In this embodiment, the outer peripheral surface of the glass rod before the formation of the glass layer is processed by mechanical means. At this time, the glass rod is vertically and rotatably held in the container of a cylindrical shape containing a liquid such as water, etc. mixed with an abrasive such as selenium oxide, colloidal silica, etc., to make the glass rod rotary. For this case, it is possible to set the maximum roughness of the outer peripheral surface of the glass rod to 0.5 μm or less. In this case, the maximum roughness is more preferably 0.2 μm or less. The maximum roughness is preferably as small as possible, most preferably 0 μm. Further, by the above processing method, the maximum roughness of about up to 0.05 μm can be realized.

Further, when processing the outer peripheral surface of the glass rod by mechanical means, the processing can be performed in two steps. That is, a pre-processing is performed by first mechanical means so that the maximum roughness of the outer peripheral surface can be 3 μm or less, and then a finishing processing is performed by the above mechanical means (second mechanical means), thereby being capable to perform the surface treatment effectively. In this pre-processing, it is possible to adapt a conventional technique (the method for polishing the surface of the glass rod by flame, the method for polishing and grinding the glass rod surface by mechanical means such as a grinding stone, the method for heating and melting the inner surface or surface of the glass tube by means such as a heater, the method for pre-processing by chemical means using hydrofluoric acid, and the like) as it is.

By the embodiment of the present invention, once after the outer peripheral surface of a silica-based glass rod treated by mechanical means, the following merits are obtained. That is, by forming a glass layer on the outer peripheral surface, it is possible to prevent bubble generation or interface unevenness on the interface of a new glass in the step of preparing the new glass, or in the step of drawing the glass rod to make it into an optical fiber.

A cladding layer was formed to the clouded core. As the core was not vitrified even by the vitrification of the cladding glass, the core was able to be formed into a cladding glass in a clouded state. The core was not vitrified even by the elongation process after the cladding was vitrified, however any bubble or crack didn't occur. A cladding layer was formed additionally to the preform to be formed into an optical fiber preform. Upon forming a cladding layer, if the core becomes smaller in diameter, there is a case that the core becomes vitrified, but, in most cases, it remained non-vitrified. If it becomes vitrified, it is not returned to a clouded state. These preforms are drawn and optical fiber of 20 km is obtained, and there was no abnormality in the diameter of a fiber as a bubble.

Next, optical fiber performs are made by forming a cladding layer on core rods shown in Table 2, and optical fibers for optical amplification were obtained by drawing the performs. These fibers for optical amplification were evaluated. In addition, as for the optical fibers for optical amplification, the outer diameter of the cladding is set to 125 μm and the evaluation items include a full width at half maximum (FWHM) in a wavelength spectrum of gain coefficient, shown in FIG. 11, and a maximum value of power conversion efficiency, obtained by the following formula.

Maximum value of power conversion efficiency=
$[Ps^{out}-Ps^{in}]/Pp^{in}$ wherein $Ps^{out}$ is an intensity of output signal light on EDF terminal face, $Ps^{in}$ is an intensity of input signal light on EDF terminal face, and $Pp^{in}$ is an intensity of pumping light on EDF terminal face.

Figure 10:
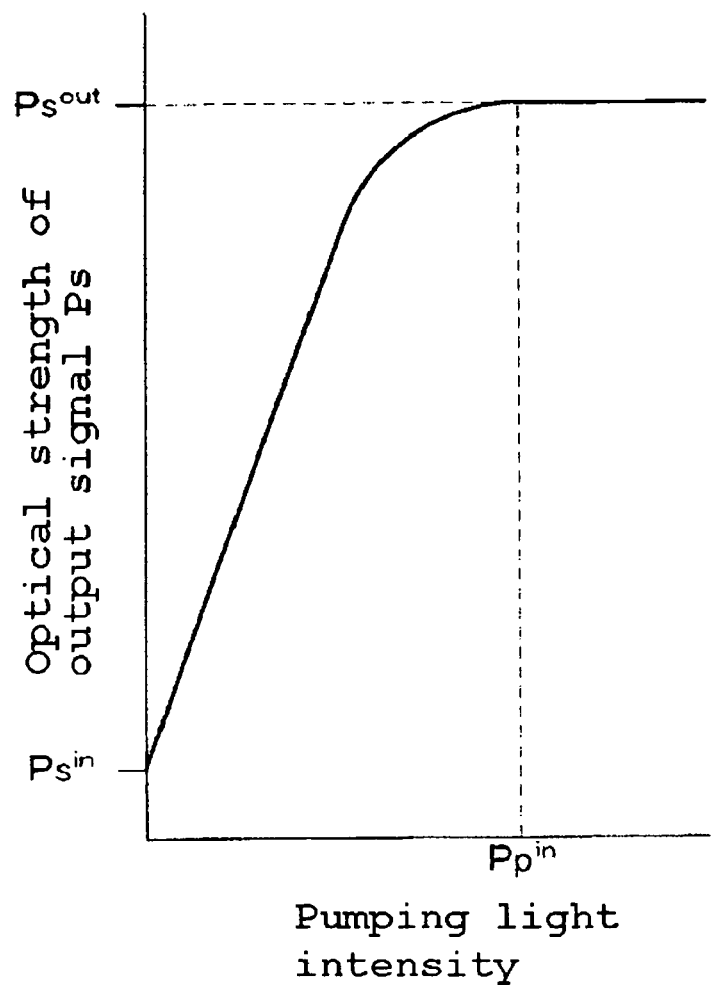
FIG. 10 is a graph showing one example of the measurement results obtained by the method exemplified in FIG. 9.

Further, these values are measured by using a gauge as shown in FIG. 9. In the gauge as shown in FIG. 9, an input signal from a signal light source (for example, 1554 nm wavelength) 91 is introduced to a first multiplexer 94 at the input side through a first optical isolator 92, and is multiplexed with the light from an pumping light source (for example, 1480 nm wavelength) 93. An erbium-doped optical fiber (EDF) 96 is fusion spliced with an input side at a first fusion point 95 and an output side at a second fusion spliced point 97. At the output side, a second multiplexer 98 de-multiplexes an output signal with the pumping light source 99 (for example, 1480 nm wavelength). An output signal is measured by an optical power meter 101 through a second optical isolator 100 (at the output side). FIG. 10 shows one example of the measurement result obtained by the gauge as shown in FIG. 9.

Examples 1 to 4, Comparative Examples 1 to 4

In Examples 1 to 4, $SiO_2$ fine particles obtained by flame hydrolysis of $SiCl_4$, $GeO_2$ fine particles obtained by flame hydrolysis of $GeCl_4$ and $Al_2O_3$ fine particles obtained by flame hydrolysis of $AlCl_3$ were deposited to a target rod (starting rod) by the VAD method, which is a deposition target, to thereby prepare an aggregate of fine silica glass particles doped with aluminum. The soot diameter was 60 mm. Herein, amount of $AlCl_3$ to be introduced was adjusted to dope the aggregate of fine silica glass particles with aluminum of 4.5 mass % in Examples 1, 3 and 4 or aluminum of 7.5 mass % in Example 2.

Next, the aggregate of fine silica glass particles doped with aluminum obtained by the above-mentioned step was immersed in a methanol solution of $ErCl_3$ and $AlCl_3$ then undergone a drying step, the above-shown oxidization step, a dehydration step and a sintering step, to thereby prepare a rare earth element-doped core rod doped with erbium and aluminum. Further, in consideration of the characteristics required by the rare earth element-doped glass, the doping amount of erbium was set to 0.1 mass % and the doping amount of aluminum was set to 0.5 mass %. Further, in Examples 3 and 4, the glass was additionally doped with La and Yb respectively. The concentration of La and Yb were set to 1.2 mass %.

The aggregate of fine silica glass particle was not forcedly transparent at 1400 to 1450° C. but vitrified by sintering and imperforation. Here, it is also possible to be transparent by increasing the temperature of the furnace up to 1550° C., but there is a risk that the core rod is elongated in the furnace. After the completion of the vitrification of the core glass, it may be transparent or clouded. Afterwards, the core glass was formed into an elongated core rod. The diameter of the core rod was 10 mm. Herein, annealing was performed for five hours at 1200° C. Since the surface of the core glass became rough due to crystallization or the like, the surface was polished by mechanical processing until the surface roughness Ry reached 0.07 µm and the surface roughness Ra reached 0.01 µm, cleaned and made into a core rod having a mirror surface. Also in this state, the core was in a clouded and crystallized state.

In contrast with this, in Comparative Examples 1, 3 and 4, the core rod was vitrified by performing a strong heating process upon making into the core rod. In Comparative Example 1, the diameter was set to 10 mmΦ. In Comparative Examples 3 and 4, the diameter was further decreased to be 5 mmΦ and 3 mmΦ respectively. Afterwards, annealing was performed for five hours at 1200° C. Afterwards, reheating treatment was strongly preformed. Then, since the surface of the core glass became rough due to crystallization or the like, the surface was polished by mechanical polishing until the surface roughness Ry reached 0.07 µm and the surface roughness Ra reached 0.01 µm, cleaned and made into a core rod having a mirror surface. In this state, the core was in a vitrified state.

Further, Comparative Example 2 was conducted by the same method as the above examples, except that no aluminum is doped in the immersion step, thus resulting the elongated core rod as it is clouded from the clouded core soot.

To the thusly obtained core of each of Examples and Comparative Examples, cladding layers were formed respectively, thereby being formed into an optical fiber preform, a pre-drawing processing was performed appropriately and then a drawing was performed to make the optical fiber.

Amount of each doped element of these rare earth element-doped glasses is shown in Table 2 and the result of drawing of the optical fiber preform is shown in Table 3.

Figure 11:
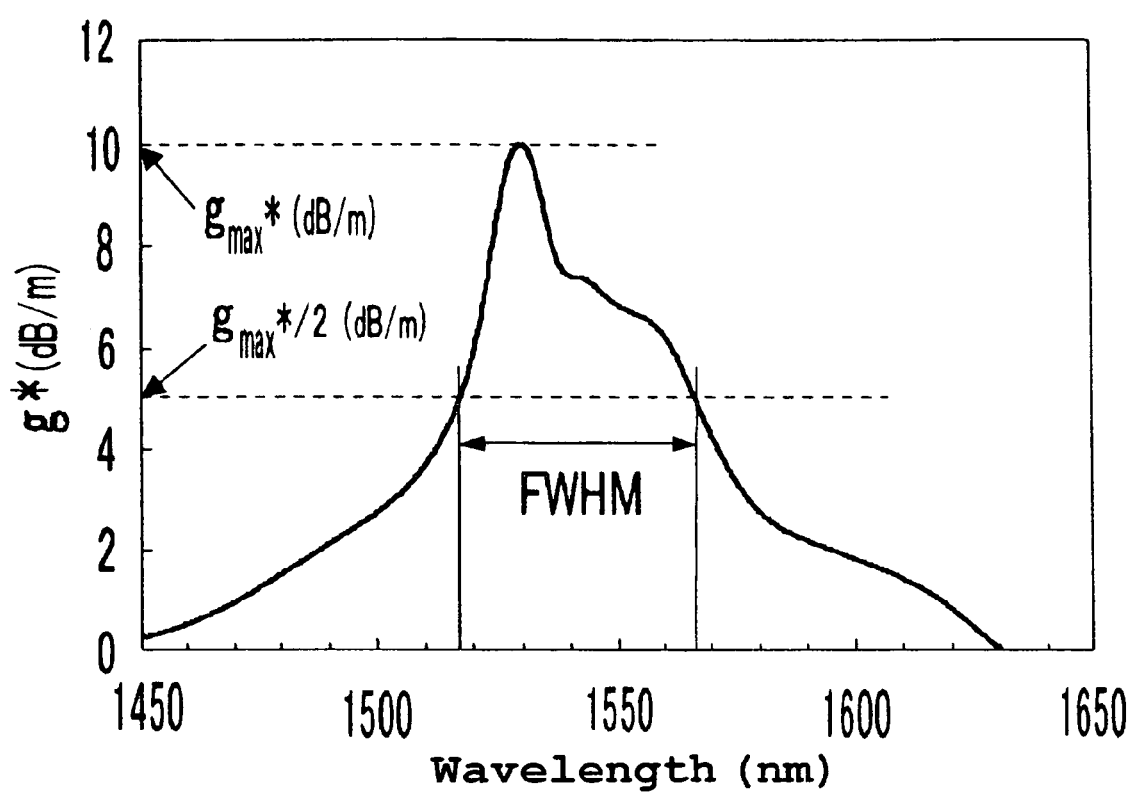
FIG. 11 is a graph showing a measurement example of a wavelength spectrum of a gain coefficient (g*(dB/m))

Further, as for the fiber for optical amplification, the outer diameter of the cladding is set to 125 µm and the evaluation items include a full width at half maximum (FWHM) in a wavelength spectrum of gain coefficient, shown in FIG. 11, and a maximum value of power conversion efficiency, obtained in the above-mentioned formula.

TABLE 2

| | Al doping amount (mass %) | | | Ge doping | | Er doping | La doping | Yb doping |
|---|---|---|---|---|---|---|---|---|
| | First step | Second step | sum | amount (mass %) | elongated core rod | amount (mass %) | amount (mass %) | amount (mass %) |
| Example 1 | 4.5 | 0.5 | 5.0 | 10 | clouded | 0.1 | 0 | 0 |
| Example 2 | 7.5 | 0.5 | 8.0 | 10 | clouded | 0.1 | 0 | 0 |
| Example 3 | 4.5 | 0.5 | 5.0 | 10 | clouded | 0.1 | 1.2 | 0 |
| Example 4 | 4.5 | 0.5 | 5.0 | 10 | clouded | 0.1 | 0 | 1.2 |
| Comparative Example 1 | 4.5 | 0.5 | 5.0 | 10 | Vitrified | 0.1 | 0 | 0 |
| Comparative Example 2 | 5.0 | 0.5 | 5.0 | 10 | clouded | 0.1 | 0 | 0 |

TABLE 2-continued

|  | Al doping amount (mass %) | | | Ge doping | | Er doping | La doping | Yb doping |
| --- | --- | --- | --- | --- | --- | --- | --- | --- |
|  | First step | Second step | sum | amount (mass %) | elongated core rod | amount (mass %) | amount (mass %) | amount (mass %) |
| Comparative Example 3 | 4.5 | 0.5 | 5.0 | 10 | Vitrified (Φ5) | 0.1 | 0 | 0 |
| Comparative Example 4 | 4.5 | 0.5 | 5.0 | 10 | Vitrified (Φ3) | 0.1 | 0 | 0 |

TABLE 3

|  | FWHM (nm) | Maximum power conversion efficiency (%) |
| --- | --- | --- |
| Example 1 | 48 | 89 |
| Example 2 | 50 | 88 |
| Example 3 | 48 | 83 |
| Example 4 | 48 | 82 |
| Comparative Example 1 | Drawing is not possible. | Not measurable |
| Comparative Example 2 | 48 | 72 |
| Comparative Example 3 | Drawing is not possible. | Not measurable |
| Comparative Example 4 | Cladding layer is not formable. | Not measurable |

As shown in Table 3, the fiber optical amplification of Examples 1 to 4 all exhibit excellent characteristics including 45 nm or more of a full width at half maximum in a gain bandwidth of gain coefficient and the maximum value of conversion efficiency of not less than 80%, but it is found out that the optical fiber for optical amplification obtained by drawing in Comparative Example 2 has at least one of less gain bandwidth and less conversion efficiency than that of optical fibers for optical amplification in Examples.

The reason why the characteristics of the optical fiber for optical amplification of Comparative Example 2 is that concentration quenching occurs due to the aggregation of erbium ions since the coordination of aluminum around erbium is not efficient.

Figure 3:
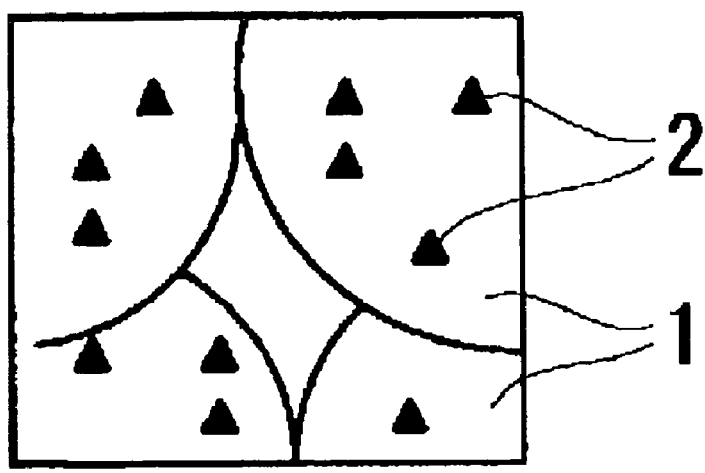
FIGS. 3(a) to 3(c) are schematic views showing a glass composition of Comparative Example 2 obtained by the conventional method for manufacturing the rare earth element-doped glass by using an aluminum vapor phase doping method and an erbium-only solution doping method according to individual production processes, respectively.
Figure 3:
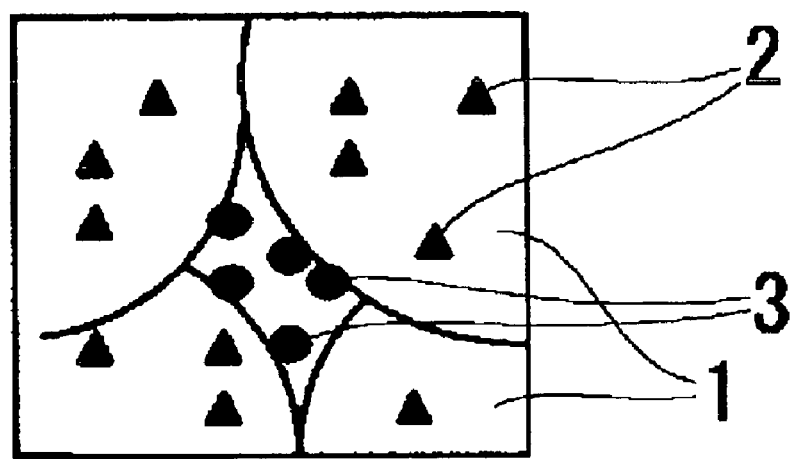
Figure 3:
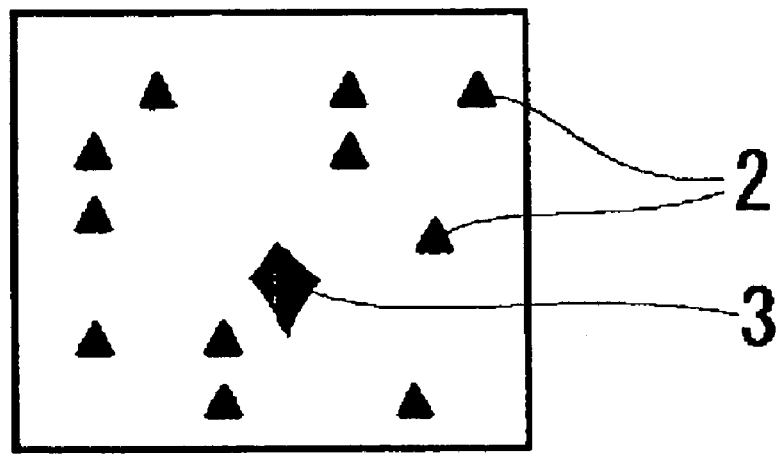

The above cause is explained according to the glass composition schematically shown according to the production process of FIGS. 1(a) to 3(c). FIGS. 1(a) to 1(c) are schematic views of a glass composition of Examples 1 to 4 obtained by the method for producing the rare earth element-doped glass of the present invention. FIGS. 2(a) and 2(c) are schematic views of a glass composition of Comparative Examples 1, 3 and 4 obtained by the method for producing the rare earth element-doped glass by only conventional solution-doping method. FIGS. 3(a) to 3(c) are schematic views of the glass composition of Comparative Example 2 obtained by the method for producing the rare earth element-doped glass by a doping method comprising a conventional aluminum vapor-phase-doping method and only erbium solution doping method.

The glass compositions of Examples 1 to 4 are explained with reference to FIGS. 1(a) to 1(c). Firstly, aluminum 2 is doped in the step of forming an aggregate of fine silica glass particles (first deposition step), and as shown in FIG. 1(a), aluminum particles 2 become dispersed in the aggregate 1 of fine silica glass particles. Next, aluminum 2 and erbium 3 are doped in the step of doping the rare earth element (immersion step), and as shown in FIG. 1(b), aluminum particles 2 are dispersed in the aggregate 1 of fine silica glass particles, thus the aluminum particles 2 and the erbium particles 3 are confined in voids between aggregates 1 of silica glass particles. By sintering the resultant particles, as shown in FIG. 1(c), aluminum 2 is dispersed in the entire glass and erbium 3 becomes non-aggregated due to the presence of aluminum 2.

As a result, it is found out that the doping amount of aluminum is sufficient, thus the aggregation of erbium ions does not occur and concentration quenching hardly occurs.

The glass compositions of Comparative Examples 1, 3 and 4 are explained with reference to FIGS. 2(a) to 2(c). Firstly, aluminum 2 is not doped in the step of forming the aggregate of fine silica glass particles (deposition step), and as shown in FIG. 2(a), dopants become a non-dispersed state in the aggregate 1 of fine silica glass particles. Next, aluminum 2 and erbium 3 are doped in the step of doping the rare earth element (immersion step), and as shown in FIG. 2(b), the aluminum particles 2 and the erbium particles 3 are confined in the void between the aggregates 1 of silica glass particles. By sintering the resultant particles, as shown in FIG. 2(c), erbium 3 does not aggregate due to the presence of aluminum 2 while dopants are not dispersed entirely but localized.

As a result, it is found out that aluminum and erbium are localized in the place where there was the void between fine particles of the aggregate of fine silica glass particles, thus causing the degradation of conversion efficiency.

The glass composition of Comparative Example 2 is explained with reference to FIGS. 3(a) to 3(c). Firstly, aluminum 2 is doped in the step of forming the aggregate of fine silica glass particles (deposition step), and as shown in FIG. 3(a), aluminum particles 2 become dispersed in the aggregate 1 of fine silica glass particles. Next, erbium 3 is doped in the step of doping the rare earth element (immersion step), and as shown in FIG. 3(b), aluminum particles 2 are dispersed in the aggregate 1 of fine silica glass particles, thus the erbium particles 3 are confined in the void between the aggregates 1 of silica glass particles. By sintering the resultant particles, as shown in FIG. 3(c), aluminum 2 is dispersed in the entire glass and erbium 3 becomes localized to be aggregated.

As a result, it is found out that the aluminum does not effectively coordinated around erbium and thus the aggregation of erbium ions makes concentration quenching.

Further, in order to investigate the probable maximum doping amount of erbium, when aluminum is doped in the deposition step so that the concentration of aluminum is about 5 mass %, the concentration of aluminum doped in the immersion step is altered, and then researching the maximum concentration of erbium that can be doped without occurring a concentration quenching. The result is shown in FIG. 4.

Further, the occurrence of concentration quenching is investigated by fluorescence lifespan: if the fluorescence lifespan is 9 msec or more, this is indicated as good (○), if the fluorescence lifespan is 7 msec to less than 9 msec, this is indicated as probable or moderate (Δ), and the fluorescence lifespan is less than 7 msec, this is indicated as poor (X). The lifespan indicated as good (○) and probable (Δ) means an acceptable level, and the lifespan indicated as poor (X) means an unacceptable level.

Figure 4:
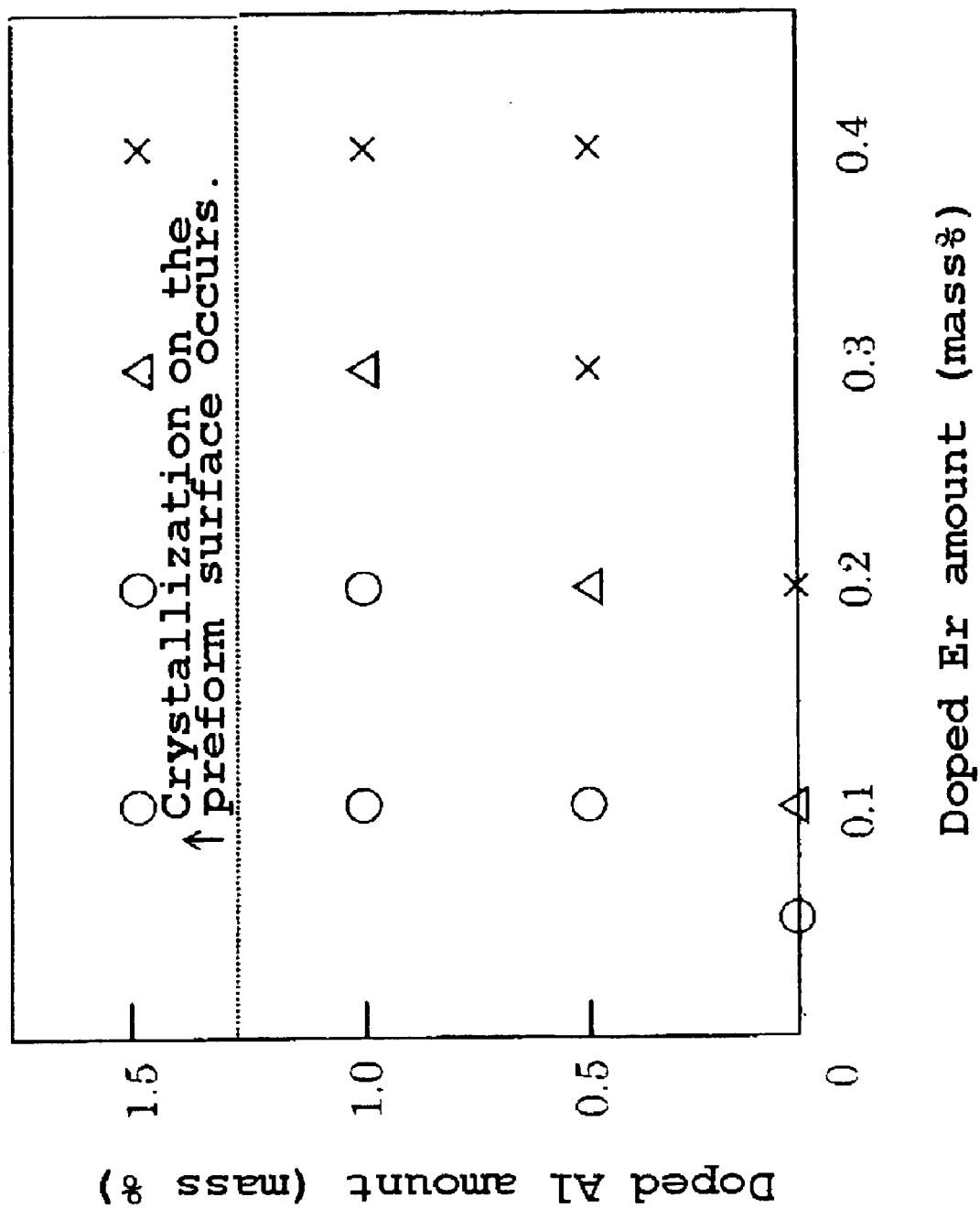
FIG. 4 is an explanatory view showing a relationship between an aluminum concentration and an erbium concentration doped in a immersion process.

From FIG. 4, it can be known that, even if aluminum is doped in deposition step so that the concentration of aluminum can be about 5 mass %, if aluminum is not doped in the immersion step, an erbium concentration of more than 0.1 mass % occurs concentration quenching.

Therefore, it can be known that the further doping of aluminum in the immersion step can increase the upper limit of the concentration of erbium at which concentration quenching occurs.

Meanwhile, if the doping amount of aluminum in the immersion step is, for example, 1.5 mass % or more, clustering occurs on the surface of the aggregate due to aluminum. If clustering occurs, it is difficult to use the prepared glass for the purpose of an optical fiber for optical amplification unless the clustered portion is not removed.

If the doping amount of aluminum in the immersion step is about 1.5 mass %, the portion to be removed becomes as small as that to be in practice. In contrast, if the concentration of aluminum is about 5 mass %, clustering caused by aluminum occurs a lot even inside the aggregate, thus this is not preferable from a viewpoint of improving the productivity because an obtainable rare earth element-doped glass is made to be small. Further, as for the range in which the portion to be removed becomes smaller to such an extent to be made practicable, the doping amount of aluminum in the immersion step is 2 mass % or less. That is, the concentration of aluminum doped in the immersing step is preferably 2 mass % or less, more preferably 1 mass % or less.

Further, in Comparative Example 1, in the case that a cladding layer was formed to a vitrified core rod, after performing a cladding vitrification or upon performing a flame polishing after the cladding vitrification, or after jacketing, the core was clouded to generate a heavy foaming on the interface between the cladding and the core because of occurrence of a large volume reduction, or to occur cracks on the core rod.

In Comparative Example 3, the diameter was further reduced from 10 μmΦ to 5 μmΦ, elongated and undergone a strong heating process, to thereby prepare a vitrified core rod. When a cladding layer was formed to this core rod, the core rod was clouded and bubbles were generated. In Comparative Example 4, a cladding layer forming was attempted by further making the diameter finer up to 3 mmΦ, however, the cladding layer forming was not sufficient because the diameter of the core rod was too small. Further, jacketing was attempted, but the diameter was too small, thus the core was elongated or bent in the jacket.

In Example 2, aluminum was further doped at up to 8 mass %, and the same procedure as Example 1 was performed. This preform was drawn in the same manner, thus no bubble was generated. The amplification characteristics of the fiber were good, including the full width at half maximum of 50 nm and the conversion efficiency of 88%.

In this way, it can be known that the method for manufacturing a rare earth element-doped glass of the present invention is an appropriate method for preparing a rare earth element-doped glass of high functionality.

It is needless to say that the scope of the present invention is not limited to the above-stated examples.

INDUSTRIAL APPLICABILITY

The fiber for optical amplification of the present invention is favorable as a part for optical amplification for use in optical communication.

The method for manufacturing a rare earth element-doped glass of the present invention is also preferable as a method for manufacturing a rare earth element-doped glass of high functionality that is used for a part for optical amplification for use in optical communication, such as an optical fiber for optical amplification.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. An optical fiber for optical amplification, characterized in that a full width at half maximum of a gain spectrum is 45 nm or more; and a value of power conversion efficiency is 80% or more.

2. A method for manufacturing a rare earth element-doped glass for use in manufacturing an optical fiber for optical amplification wherein the optical fiber has a full width at half maximum of a gain spectrum of 45 nm or more, and a maximum value of power conversion efficiency of 80% or more, comprising:

depositing fine silica glass particles obtained by reacting a silica glass material and a co-dopant (a) obtained by reacting a raw material for the co-dopant (a) to prepare an aggregate of fine silica glass particles doped with the co-dopant (a); and immersing the aggregate of fine silica glass particles doped with the co-dopant (a) in a solution containing a rare earth element and a co-dopant (b) for doping the rare earth element and the co-dopant (b) to the aggregate of fine silica glass particles doped with the co-dopant (a), wherein the co-dopant (a) is selected from an element group (A) and the co-dopant (b) is selected from an element group (B), wherein the element group (A) is composed of elements configured to control gain spectrum of the optical fiber for optical amplification, and the group (B) is composed to the elements to control energy conversion efficiency of the optical fiber for optical amplification, and aluminum is contained in both of at least one selected from the element group (A) and at least one selected from the element group (B), and a total concentration of aluminum doped in the depositing step and the immersing step is not less than 1.5 mass %.

3. The method according to claim 2, wherein a concentration of aluminum doped in the immersing step is not more than 1.5 mass %.

4. The method according to claim 2, wherein the concentration of aluminum doped in the depositing step is the same as or greater than the concentration of aluminum doped in the immersing step.

5. The method according to claim 2, further comprising:
drying the aggregate of fine silica glass particles after the immersing step;
oxidizing at least one of the rare earth element and the co-dopant element doped in the immersing step after the drying step;
dehydrating the aggregate of fine silica glass particles after the oxidizing step; and
sintering the aggregate of fine silica glass particles after the dehydrating step.

6. The method according to claim 5, wherein the oxidization is carried out under oxygen-containing atmosphere and under a condition of increasing a temperature from nearly a room temperature to a temperature where the rare earth element and the co-dopant element are completely oxidized at a temperature elevation rate of not more than 600° C./hr.

7. The method according to claim 5, further comprising removing a crystal water contained in at least one of the rare earth element and the co-dopant element doped in the immersing step.

8. The method according to claim 7, wherein the crystal water removal step is carried out under an oxygen-containing atmosphere and under a condition of increasing temperature from nearly a room temperature to a temperature where the crystal water is substantially completely removed at the temperature elevation rate of 30 to 240° C./hr then substantially maintained at the same temperature.

9. A method for manufacturing a rare earth element-doped glass used in manufacturing an optical fiber for optical amplification wherein the optical fiber has a full width at half maximum of a gain spectrum of 45 nm or more; and a maximum value of power conversion efficiency of 80% or more, comprising:
polishing a silica glass rod so that a maximum roughness (Ry) of the outer circumferential surface is not more than 0.5 μm by mechanical means;
cleaning the polished silica glass rod; and then forming a glass layer on outer circumferential surface of the silica glass rod.

10. The method according to claim 9, wherein
first polishing the silica glass rod so that the maximum roughness (Ry) of the outer circumferential surface is not more than 3 pm by first mechanical means;
second polishing the silica glass rod so that the maximum roughness (Ry) of the outer circumferential surface is not more than 0.5 pm by second mechanical means; cleaning the polished silica glass rod; and then forming a glass layer on outer circumferential surface of the silica glass rod.

11. A method for manufacturing a rare earth element-doped glass used in manufacturing an optical fiber for optical amplification wherein the optical fiber has a full width at half maximum of a gain spectrum of 45 nm or more; and a maximum value of power conversion efficiency of 80% or more, comprising:
heating a glass rod with at least partially containing crystals at a temperature higher than a glass formation temperature; and
cooling the glass rod at a cooling speed higher than a cooling speed in which the crystals can be extracted from the glass.

12. The method according to claim 11, further comprising:
depositing fine particles to prepare an aggregate of fine silica glass particles; and
heating the aggregate of fine silica glass particles so as to make the fine silica glass particles into imperforate rod.

13. The method according to claim 12, wherein the imperforation is carried out within a temperature range from 1000° C. to 1500° C.

14. The method according to claim 11, wherein
the cooling speed is expressed by the following formula:

cooling speed (° C./sec)=−178×$ln(r)$+618 wherein $r$ is the glass rod radius (mm).

15. The method according to claim 11, wherein the cooling speed allowing the crystals to be generated is determined by the composition of materials and the radius of the glass rod not-crystallized is determined from the cooling speed by the following formula:

glass rod radius (mm)=EXP{−(S−618)/178} wherein S is the cooling speed (° C./sec).

16. The method according to claim 11, wherein the cooling speed is 400° C./sec or more.

17. The method according to claim 11, wherein
heating is carried out after the glass rod becomes smaller than at least a part of core or cladding diameter of not more than 5 mm.

18. A rare earth element-doped glass used in manufacturing an optical fiber for optical amplification wherein the optical fiber has a full width at half maximum of a gain spectrum of 45 nm or more; and a maximum value of power conversion efficiency of 80% or more, comprising:
a glass rod having at least partially containing crystals and a diameter of not less than 5 mm at least partially containing crystals, and comprising a rare earth element and an aluminum compound,
wherein the concentration of aluminum is not less than 3.5 mass %.

19. The rare earth element-doped glass according to claim 18, wherein
all or a part of the crystals is mullite.

20. The rare earth element-doped glass according to claim 18, wherein the crystals are a material of which overall volume is reduced by transition from a glass phase or extraction from the glass phase.

21. A method for manufacturing an optical fiber for optical amplification wherein the optical fiber has a full width at half maximum of a gain spectrum of 45 nm or more, and a maximum value of power conversion efficiency of 80% or more, comprising:
forming a cladding layer on a core rod having a high concentration of aluminum and being clouded;
sintering the cladding layer and a glass rod that at least partially contains crystals; and
drawing the glass rod for making the optical fiber, wherein the core is made transparent in the drawing step.

22. A method for manufacturing a rare earth element-doped glass for use in manufacturing an optical fiber for optical amplification wherein the optical fiber has a full width at half maximum of a gain spectrum of 45 nm or more, and a maximum value of power conversion efficiency of 80% or more, comprising:
depositing fine silica glass particles obtained by reacting a silica glass material and a co-dopant (a) obtained by reacting a raw material for the co-dopant (a) to prepare an aggregate of fine silica glass particles doped with a co-dopant (a); and
immersing the aggregate of fine silica glass particles doped with the co-dopant (a) in a solution containing a rare earth element and a co-dopant (b) for doping the rare earth element and the co-dopant (b) to the aggregate of fine silica glass particles doped with the co-dopant (a);

drying the aggregate of fine silica glass particles after the immersing step;

oxidizing at least one of the rare earth element and the co-dopant element doped in the immersing step after the drying step;

dehydrating the aggregate of fine silica glass particles after the oxidizing step; and sintering the aggregate of fine silica glass particles after the dehydrating step, wherein the oxidization is carried out under oxygen-containing atmosphere and under a condition of increasing a temperature from nearly a room temperature to a higher temperature where the rare earth element and the co-dopant element are completely oxidized at a temperature elevation rate of not more than 600° C./hr.

23. A method for manufacturing a rare earth element-doped glass for use in manufacturing an optical fiber for optical amplification wherein the optical fiber has a full width at half maximum of a gain spectrum of 45 nm or more, and a maximum value of power conversion efficiency of 80% or more, comprising:

depositing fine silica glass particles obtained by reacting a silica glass material and a co-dopant (a) obtained by reacting a raw material for the co-dopant (a) to prepare an aggregate of fine silica glass particles doped with the co-dopant (a); and immersing the aggregate of fine silica glass particles doped with the co-dopant (a) in a solution containing a rare earth element and a co-dopant (b) for doping the rare earth element and the co-dopant (b) to the aggregate of fine silica glass particles doped with the co-dopant (a);

drying the aggregate of fine silica glass particles after the immersing step;

oxidizing at least one of the rare earth element and the co-dopant element doped in the immersing step after the drying step;

dehydrating the aggregate of fine silica glass particles after the oxidizing step; and sintering the aggregate of fine silica glass particles after the dehydrating step, further comprising removing a crystal water contained in at least one of the rare earth element and the co-dopant element doped in the immersing step, wherein the crystal water removal step is carried out under an oxygen-containing atmosphere and under a condition of increasing temperature from nearly a room temperature to a higher temperature where the crystal water is substantially completely removed at the temperature elevation rate of 30 to 240° C./hr then substantially maintained at the same temperature.

* * * * *